US011970343B1

(12) United States Patent
Terhuja et al.

(10) Patent No.: US 11,970,343 B1
(45) Date of Patent: Apr. 30, 2024

(54) MULTIMODAL IDENTIFICATION SYSTEM AND METHOD FOR ROBOTIC ITEM MANIPULATORS

(71) Applicant: Amazon Technologies, Inc., Seattle, WA (US)

(72) Inventors: Vikedo Terhuja, Woburn, MA (US); Chaitanya Mitash, Waltham, MA (US); Tyler W. Garaas, Boxford, MA (US); Priyesh Shah, Everett, MA (US); Ugur Murat Erdem, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 17/212,381

(22) Filed: Mar. 25, 2021

(51) Int. Cl.
*B65G 47/91* (2006.01)
*B25J 9/16* (2006.01)
*B25J 13/08* (2006.01)

(52) U.S. Cl.
CPC ............ *B65G 47/917* (2013.01); *B25J 9/163* (2013.01); *B25J 9/1653* (2013.01); *B25J 9/1679* (2013.01); *B25J 9/1697* (2013.01); *B25J 13/085* (2013.01); *B65G 2203/0216* (2013.01); *B65G 2203/0258* (2013.01); *B65G 2203/041* (2013.01)

(58) Field of Classification Search
CPC .......... B65G 47/917; B65G 2203/0216; B65G 2203/0258; B65G 2203/041; B25J 9/163; B25J 9/1653; B25J 9/1679; B25J 9/1697; B25J 13/085
See application file for complete search history.

(56) References Cited

U.S. PATENT DOCUMENTS

| | | | |
|---|---|---|---|
| 10,558,944 B1* | 2/2020 | Elazary | G06Q 10/087 |
| 2016/0224657 A1* | 8/2016 | Mullins | G06F 16/951 |
| 2017/0132867 A1* | 5/2017 | Berg | A61J 7/0481 |
| 2018/0282066 A1* | 10/2018 | Wagner | B65G 1/1378 |
| 2019/0359424 A1* | 11/2019 | Avraham | G06Q 50/28 |
| 2020/0130935 A1* | 4/2020 | Wagner | B65G 1/1371 |
| 2020/0160011 A1* | 5/2020 | Wagner | B65G 25/04 |
| 2021/0069903 A1* | 3/2021 | Duan | B25J 9/161 |
| 2021/0394364 A1* | 12/2021 | Ogawa | B25J 9/1687 |

* cited by examiner

*Primary Examiner* — Adam R Mott
*Assistant Examiner* — Elizabeth Rose Neleski
(74) *Attorney, Agent, or Firm* — Eversheds Sutherland (US) LLP (57) ABSTRACT

An apparatus includes a memory and a hardware processor. The hardware processor determines one or more of a weight of an item, a packaging type of the item, a packaging material of the item, a barcode of the item, a rigidity of the item, or a physical response of the item to being lifted and determines a visual appearance of the item and a shape or size of the item. The hardware processor also compares, using a machine learning model, the determined characteristics of the item to a manifest for the container. The manifest identifies a plurality of items in the container. The hardware processor determines, using the machine learning model, an identity of the item based on comparing the determined characteristics of the item to the manifest.

17 Claims, 8 Drawing Sheets

MULTIMODAL IDENTIFICATION SYSTEM AND METHOD FOR ROBOTIC ITEM MANIPULATORS

BACKGROUND

The present invention relates to multimodal identification, and more specifically, to multimodal identification of items for a robotic item manipulation system.

DETAILED DESCRIPTION

Robotic arms are used to sort, organize, and handle items (e.g., items stored in totes in a warehouse). The robotic arms may pick up an item and use a scanner (e.g., a barcode scanner) to scan a code (e.g., a barcode) on the item. This code is then used to identify the item and to determine how the robotic arm should handle the item. For example, the robotic arm may organize the item in a particular container. As another example, the robotic arm may place the item at a particular location for delivery. As yet another example, the robotic arm may discard the item.

Relying solely on the code to identify the item, however, may have several shortcomings that result in errors. For example, the code on the item may be obscured or damaged, which may result in an incorrect scan and identification. As another example, the code may be small and not easy to locate, which may result in the item not being identified at all. As a result of these issues, using codes, such as barcodes, to identify items is not effective or efficient in robotic applications.

This disclosure describes a multimodal identification system that uses many different characteristics of an item to identify the item. For example, the system may include one or more sensors that detect different characteristics of an item (e.g., visual appearance, weight, and dimension) in a container. The system then compares this information to a manifest that describes the characteristics of items in the container to determine the identity of the item. Based on the determined identity, the system may instruct a robotic arm how to handle the item. In this manner, the characteristics of the item may be used to identify the item even when a code on the item cannot be scanned. Even if the code can be scanned, the system may use the characteristics of the item to supplement or validate the identification of the item using the code. Additionally, in certain embodiments, the system can identify or distinguish millions of different products, some of which have similar features (e.g., visual appearance and shape). Moreover, the system is robust and can handle unstructured arrangements of the items in the container, in some embodiments. Stated differently, the system can identify and distinguish the different items in the container regardless of the spatial configuration and combination of the items in the container.

Figure 1:
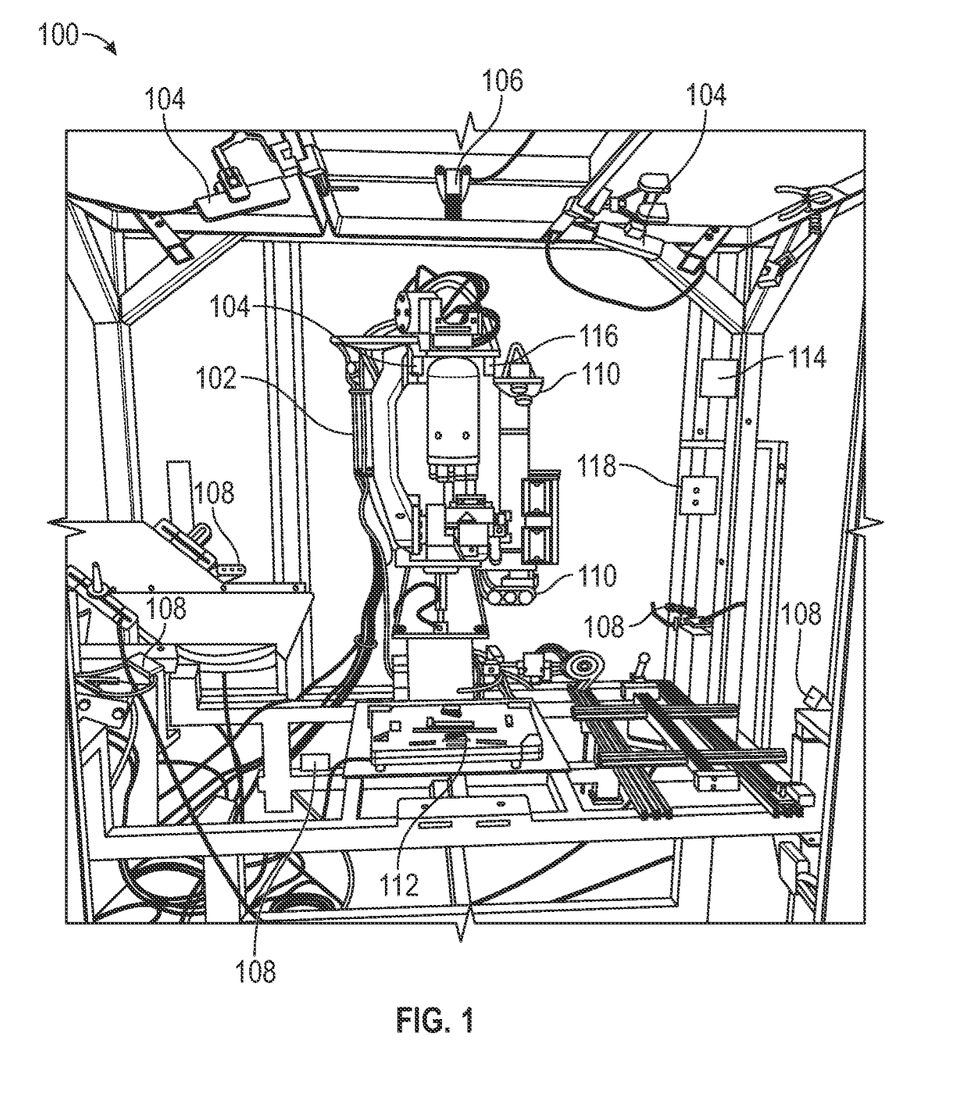
FIG. 1 illustrates an example system.

FIG. 1 illustrates an example system 100. As seen in FIG. 1 the system 100 includes a robotic arm 102 and one or more sensors 104, 106, 108, 110, 112, 114, 116, and 118 positioned around the robotic arm 102. The system 100 may include any number of any types of sensors. In particular embodiments, the sensors 104, 106, 108, 110, 112, 114, 116, and 118 detect particular characteristics of an item. The item may be identified based on these characteristics and the robotic arm 102 may handle the item based on this identification. Additionally, the sensors 104, 106, 108, 110, 112, 114, 116, and 118 are communicatively coupled to a computer system that receives information from the sensors 104, 106, 108, 110, 112, 114, 116, and 118 and identifies the item based on this information. In some embodiments, multiple sensors may be integrated into a common physical device capable of detecting various characteristics of interest.

The robotic arm 102 may autonomously move to grab and handle items. For example, information from one or more of the sensors 104, 106, 108, 110, 112, 114, 116, and 118 may be used to determine the positioning of an item near the robotic arm 102. The robotic arm 102 may then use that positioning information to move and grab the item. Information from one or more of the sensors 104, 106, 108, 110, 112, 114, 116, and 118 may also be used to identify the item. Based on this identification, the robotic arm 102 may appropriately handle the item. For example, the robotic arm 102 may organize the item into a particular container. As another example, the robotic arm 102 may place the item at a particular location for delivery. As yet another example, the robotic arm 102 may discard the item.

In the example of FIG. 1, the system 100 includes one or more sensors 104, 106, 108, 110, 112, 114, 116, and 118. The sensors 104, 106, 108, 110, 112, 114, 116, and 118 may sense different characteristics of an item. These characteristics may then be used to determine a position of the item or to identify the item.

The sensors 104 may be three-dimensional (3D) sensors that determine a position of an item in a three dimensional space. For example, the sensors 104 may scan an item to determine coordinates that represent the position of the item in a three dimensional space. These coordinates may reveal the boundaries of the item in the three dimensional space. This information may be used to assist the robotic arm 102 in determining the location of an item, so that the robotic arm 102 may move to grab the item. The system 100 may include any number of sensors 104. The sensors 104 may be positioned around the robotic arm 102 or on the robotic arm 102.

The sensor 106 may be a color sensor that scans an item to determine one or more colors of the item. The sensor 106 may also determine coordinates that reveal the arrangement of the determined colors on the item. For example, the sensor 106 may emit light towards an item and then detect the light reflected back from the item. The sensor 106 may then detect the reflected light intensity for red, blue, and green making it possible to determine the color of the item. The color of the item may then be used to identify the item. The system 100 may include any number of sensors 106. The sensor 106 may be one or more sensors that emit light of any wavelength. For example, the one or more sensors may emit visible light, short wave infrared, millimeter wave, or multi-spectral light.

The sensor 108 may be a three-dimensional camera that produces three-dimensional images of an item. For example, the sensors 108 may be red, green, blue, depth (RGBD) sensors that produce color images of the item augmented with depth information. These images may be analyzed to determine a visual appearance of the item (e.g., colors, shapes, or textures of the item). This information may then be used to identify the item. The system 100 may include any number of sensors 108 positioned around the robotic arm 102. For example, the system 100 may include multiple sensors 108 positioned around the robotic arm 102 to capture images of the item from different perspectives. A sensor 108 may be positioned beneath the robotic arm 102. This sensor 108 may be pointed upwards to capture an image of a bottom or underside of the item. Sensors 108 may be positioned around the robotic arm 102 to capture images of the sides of the item 104. A sensor 108 may be positioned above the robotic arm 102 to capture images of a top surface of the item 104.

The sensors 110 may be scanners that scan codes on an item. For example, the sensors 110 may be barcode scanners that scan barcodes (e.g. linear barcodes or matrix barcodes, such as quick response codes) on the item. The sensors 110 may be coupled directly to the robotic arm 102 such that the scanners 110 move with the robotic arm 102. The scanners 110 may rotate and swivel on the robotic arm 102 so that the scanners 110 may be moved to locate a code on an item. If a code is located and scanned, the scanned code may be used to identify the item. When a code is not located or scanned, information from other sensors such as sensors 104, 106, 108, 112, and 114 may be used instead to identify the item. The system 100 may include any number of sensors 110.

The sensor 112 may be a scale that determines a weight of an item positioned on the scale. The sensor 112 may be used to determine a weight of an item grabbed by the robotic arm 102. For example, a container of items may be positioned on the sensor 112. The sensor 112 may determine a total weight of the container and the items within the container. After the robotic arm 102 has lifted an item out of the container, the sensor 112 may determine a weight of the container and the items remaining in the container. The difference between these two determined weights represents the weight of them lifted by the robotic arm 102. The weight of the item may be used to identify the item. As another example, the robotic arm 102 may lift an item out of a container and place the item on the sensor 112. The sensor 112 may then measure the weight of the item directly. The weight of the item may be used to identify the item. The system 100 may include any number of sensors 112.

The sensor 114 may be one or more cameras that emit electromagnetic waves at an item. For example, the sensor 114 may be a millimeter wave camera, a short wave infrared camera, or one or more multi-spectral cameras. The sensor 114 may be used to determine a material used to form the item or a package holding the item. For example, information from the sensor 114 may be used to determine that the item or the package is formed using paper, plastic, metal, etc. This information may be used to identify the item. The system 100 may include any number of sensors 114.

The sensor 116 may be a force-torque sensor that assists in determining a weight of an item being held by the robotic arm 102. The force-torque sensor detects a force or a torque experienced by the robotic arm 102 as the robotic arm 102 lifts or moves an item. Calculations may then be performed on the force (e.g., dividing the force by an acceleration of the robotic arm 102 to determine a mass of the item) or the torque (e.g., dividing the torque by a length of the robotic arm 102 and an acceleration of the robotic arm 102 to determine a mass of the item). In some embodiments, the system 100 includes only one of the sensor 112 and the sensor 116. In certain embodiments, the system 100 includes both the sensor 112 and the sensor 116.

The sensor 118 may be an event camera that tracks changes in brightness on different regions of an item. The changes in brightness may be used to determine different characteristics of the item. For example, the changes in brightness may be analyzed to determine a rigidity of the item. As another example, the changes in brightness may be analyzed to determine a physical response of the item to being moved or lifted by the robotic arm 102. For example, the item may be soft or gelatinous and change shape as the robotic arm 102 grabs or moves the item. As another example, the item may be hinged and open or close as the robotic arm 102 lifts or moves the item.

Figure 2:
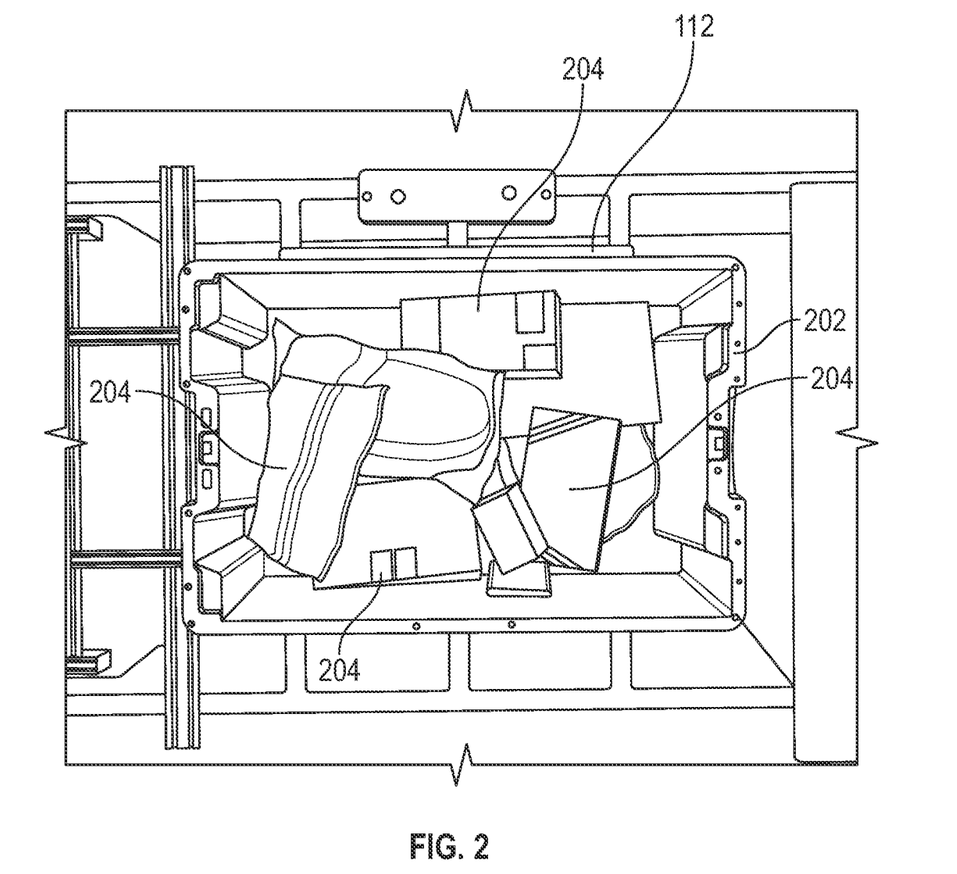
FIG. 2 illustrates an example container for the system of FIG. 1.

FIG. 2 illustrates an example container 202 for the system 100 of FIG. 1. As seen in FIG. 2, the container 202 may hold an assortment of items 204. These items 204 may be different and may have different appearances and weights. The container 202 may be placed on the sensor 112. As discussed previously, the sensor 112 may detect a weight of the container 202 and the items 204. The robotic arm 102 may grab an item 204 from the container 202. The sensors 104, 106, 108, 110, 112, and 114 may detect various characteristics of the item 204. The item 204 may then be identified using these detected characteristics. The robotic arm 102 may then handle the item 204 according to the identification.

Figure 3A:
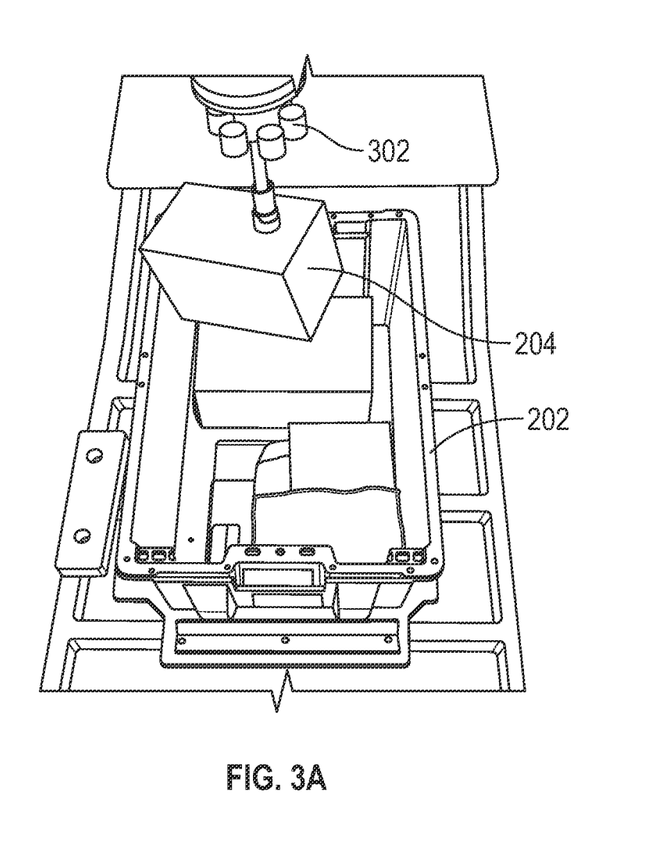
FIGS. 3A and 3B illustrate example robotic arms in the system of FIG. 1.
Figure 3B:
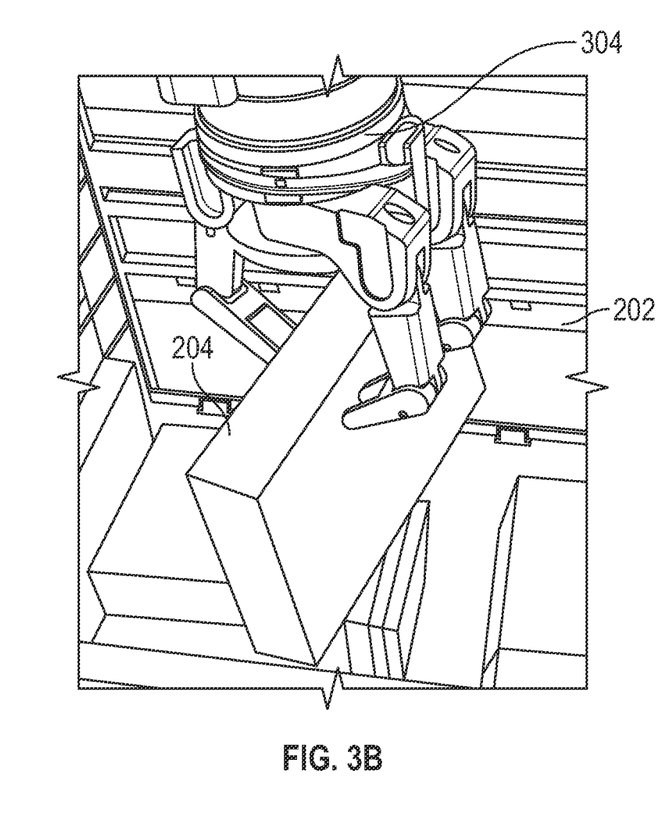

FIGS. 3A and 3B illustrate example robotic arms 102 in the system 100 of FIG. 1. The robotic arm 102 may use different mechanisms to grab or lift an item 204 from a container 202. As seen in FIG. 3A, the robotic arm 102 includes a grabber 302. The grabber 302 may include a suction cup that suctions to an item 204. The suction may allow the robotic arm 102 to lift the item 204 from the container 202. As seen in FIG. 3B, the robotic arm 102 includes a grabber 304 that includes fingers or pincers that close around an item 204. After the fingers or pincers have closed around the item 204, the robotic arm 102 may lift the item 204 from the container 202. The robotic arm 102 may include any mechanism for lifting an item 204 from the container 202.

Figure 4:
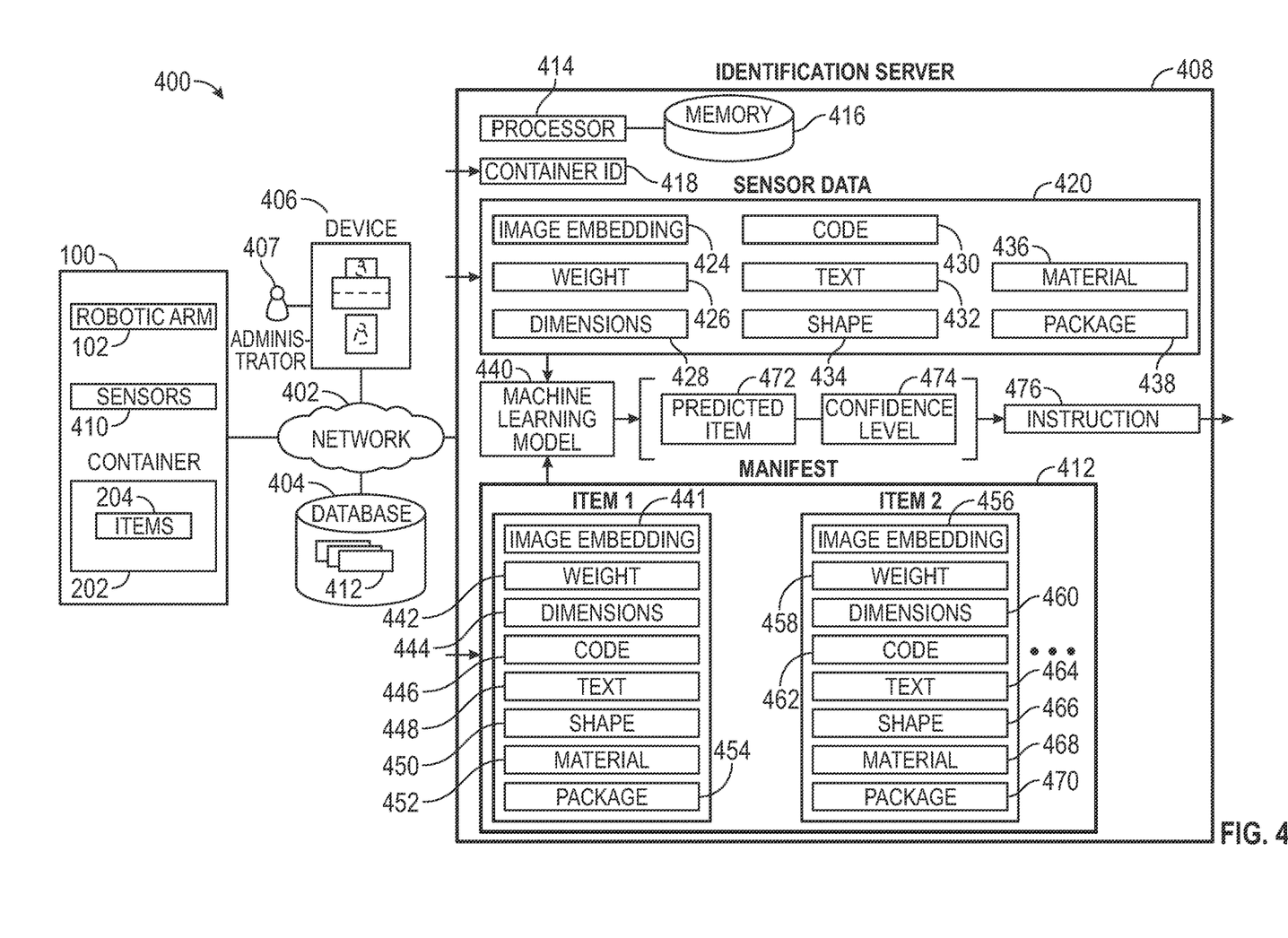
FIG. 4 illustrates an example system.

FIG. 4 illustrates an example system 400. As seen in FIG. 4, the system 400 includes the system 100 of FIG. 1, a network 402, a database 404, one or more devices 406, and an identification server 408. Generally, the identification server 408 uses information received from the sensors in the system 100 to identify an item. The identification server 408 then instructs the robotic arm 102 how to handle the item based on the identification. In particular embodiments, the identification server 408 identifies an item, even if a code on the item is not scanned.

As discussed previously, the system 100 includes the robotic arm 102, one or more sensors 410, and a container 202. The container 202 may hold an assortment of items 204. The sensors 410 (including the sensors 104, 106, 108, 110, 112, and 114) may detect certain characteristics of one or more items 204 in the system 100. The identification server 408 may use these characteristics to identify the one or more items 204. After identifying these one or more items 204, the identification server 408 may instruct the robotic arm 102 how to handle these items 204. The robotic arm 102 may then follow these instructions to handle the identified items 204. For example, the robotic arm 102 may organize the items 204 in the container 202. As another example, the robotic arm 102 may place the items 204 at a particular location for delivery. As yet another example, the robotic arm 102 may discard the items 204.

The network 402 is any suitable network operable to facilitate communication between the components of the system 400. The network 402 may include any interconnecting system capable of transmitting audio, video, signals, data, messages, or any combination of the preceding. The network 402 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 404 may store information used by the identification server 408 to identify items 204. For example, the database 404 may store manifests 412 for containers 202. Each manifest 412 may list the items 204 in a particular container 202. The manifests 412 may also include the characteristics of these items 204. The identification server 408 may compare the characteristics detected by the sensors 410 to the characteristics listed in a manifest 412 to identify an item 204.

The one or more devices 406 may be used by an administrator 407 to validate item identifications made by the identification server 408. For example, the identification server 408 may communicate a predicted identity of an item to the device 406 when the identification server 408 is not confident that the prediction is accurate. An administrator 407 may use the device 406 to review the predicted identity to validate whether the prediction was correct or not. In this manner, the administrator 407 and the device 406 operate to ensure that the identification server 408 makes correct predictions before instructing the robotic arm 102 how to handle an item 204.

The device 406 includes any suitable device for communicating with components of the system 400 over the network 402. As an example and not by way of limitation, the device 406 may be a computer, a laptop, a wireless or cellular telephone, an electronic notebook, a personal digital assistant, a tablet, or any other device capable of receiving, processing, storing, or communicating information with other components of the system 400. The device 406 may be a wearable device such as a virtual reality or augmented reality headset, a smart watch, or smart glasses. The device 406 may also include a user interface, such as a display, a microphone, keypad, or other appropriate terminal equipment usable by the administrator 407. The device 406 may include a hardware processor, memory, or circuitry configured to perform any of the functions or actions of the device 406 described herein. For example, a software application designed using software code may be stored in the memory and executed by the processor to perform the functions of the device 406.

The identification server 408 uses information from the sensors 410 to identify items 204. In particular embodiments, the identification server 408 quickly and accurately identifies items 204 in a container 202, even if codes on the items 204 are not accessible or scannable. For example, the identification server 408 may identify items 204 in less than one second. As seen in FIG. 4, the identification server 408 includes a processor 414 and a memory 416, which are configured to perform the functions or actions of the identification server 408 described herein.

The processor 414 is any electronic circuitry, including, but not limited to microprocessors, application specific integrated circuits (ASIC), application specific instruction set processor (ASIP), and/or state machines, that communicatively couples to memory 416 and controls the operation of the identification server 408. The processor 414 may be 8-bit, 16-bit, 32-bit, 64-bit or of any other suitable architecture. The processor 414 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 414 may include other hardware that operates software to control and process information. The processor 414 executes software stored on memory to perform any of the functions described herein. The processor 414 controls the operation and administration of the identification server 408 by processing information (e.g., information received from the sensors 410, the network 402, and the memory 416). The processor 414 may be a programmable logic device, a microcontroller, a microprocessor, any suitable processing device, or any suitable combination of the preceding. The processor 414 is not limited to a single processing device and may encompass multiple processing devices.

The memory 416 may store, either permanently or temporarily, data, operational software, or other information for the processor 414. The memory 416 may include any one or a combination of volatile or non-volatile local or remote devices suitable for storing information. For example, the memory 416 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 416, a disk, a CD, or a flash drive. In particular embodiments, the software may include an application executable by the processor 414 to perform one or more of the functions described herein.

The identification server 408 receives a container identifier 418. The container identifier 418 may be generated by one or more sensors 410 in the system 100. For example, a container 202 may have a code coupled to the container 202 that identifies the container 202. The system 100 may include a scanner that scans the code on the container 202 to generate the container identifier 418. The identification server 408 may use the container identifier 418 to identify the container 202 and to retrieve the manifest 412 corresponding to the identified container 202. The identification server 408 may compare information from the sensors 410 to information in the manifest 412 to identify an item 204 in the identified container 202.

The identification server 408 receives sensor data 420 from the one or more sensors 410 in the system 100. The sensor data 420 may include any number of characteristics of an item 204 detected by the one or more sensors 410. Several examples of these characteristics are provided in the example of FIG. 4. However, it is understood that the sensor data 420 may include additional characteristics not shown in the example of FIG. 4. Moreover, it is understood that the sensor data 420 may not include every characteristic shown in the example of FIG. 4.

The sensor data 420 may include an image embedding 424. The image embedding 424 may be a vector representation of an image of an item 204 (e.g., images captured by the sensors 108). The vector allows the image of the item 204 to be quickly compared with other images. For example, distances between vectors may be quickly calculated to determine the similarity between two images. The closer the two vectors are to each other, the more similar the two represented images are to each other. The identification server 408 may use the image embedding 424 to determine the items identified in a manifest 412 that have an image similar to the image of the item 204 being identified. In certain embodiments, the identification server 408 uses a machine learning model 440 to analyze information from the sensors to generate the image embeddings 424. The machine learning model 440 may be trained to extract a lower dimension vector representation for matching images. This may include extracting feature vectors that can be compared using metric space distances such as Euclidean distance. Alternatively or additionally, the machine learning model 440 may be trained to compute distances over pre-trained features.

The sensor data may include a weight 426 of the item 204. The weight 426 may be detected by the sensor 112 in the system 100. As discussed previously, the robotic arm 102 may place the item 204 on the sensor 112, and the sensor 112 may detect the weight 426. As another example, the sensor 112 may detect a total weight of the container 202 and the items 204. After the robotic arm 102 lifts the item 204 from the container 202, the sensor 112 may detect a weight of the container 202 and the remaining items 204. The sensor 112 or the identification server 408 may calculate a difference between these two weights to determine the weight 426. The identification server 408 may compare the weight 426 of the item 204 to the weights of items identified in a manifest 412 to determine the items in the manifest 412 that have similar weights to the item 204.

The sensor data 420 may include a dimension 428 of the item 204. For example, the sensor data 420 may identify a size (e.g., a length, width, or height) of the item 204. As discussed previously, the sensors 108 in the system 100 may detect the dimensions of the item 204. The identification server 408 may compare the dimensions 428 of the item 204 with the dimensions of items identified in the manifest 412 to see which item in the manifest 412 has dimensions that are closest to the dimensions 428 of the item 204.

The sensor data 420 may include a code 430. As discussed previously, the code 430 may be scanned by the sensors 110. The code 430 may be a barcode that identifies the item 204. The identification server 408 may compare the code 430 with the codes of items in the manifest 412 to see which item in the manifest 412 has a code that matches the code 430. In particular embodiments, the code 430 may not be included in the sensor data 420, because the code 430 on the item 204 may be damaged or difficult to locate. In these embodiments, the identification server 408 may still accurately identify the item 204 using the other characteristics in the sensor data 420.

The sensor data 420 may include text 432. The text 432 may be written or printed on the item 204. As discussed previously, the sensors 108 may detect the text 432 on the item 204. For example, the text 432 may include a name of the item 204, a name of a brand, a logo, a label, etc. The identification server 408 may compare the text 432 with the text on items identified in the manifest 412 to see which item in the manifest 412 has text that is most similar to the text 432 on the item 204.

The sensor data 420 may include a shape 434 of the item 204. As discussed previously, the sensors 108 may detect a shape 434 of the item 204. For example, the shape 434 may indicate that the item 204 is circular or rectangular. The identification server 408 may compare the shape 434 of the item 204 with the shapes of items identified in the manifest 412 to see which item in the manifest 412 has a shape that is most similar to the shape 434 of the item 204.

The sensor data 420 may include a material 436. For example, the sensor 114 may emit electromagnetic waves into the item 204 to determine a material used to form the item 204 or a package of the item 204. For example, the material 436 may identify the material to be paper or plastic. The identification server 408 may compare the material 436 with the materials of items identified in the manifest 412 to see which item in the manifest 412 uses a material that is most similar to the material 436 of the item 204.

The sensor data 420 may include a package 438 of the item 204. The package 438 may identify a type of packaging used to hold the item 204. For example, the package 438 may identify a bag or a box as holding the item 204. The identification server 408 may compare the package 438 of the item 204 to packages of items identified in the manifest 412, to see which item in the manifest 412 uses a package that is most similar to the package 438 of the item 204.

In some embodiments, the sensor data 420 includes a rigidity of the item 204 or a physical response of the item 204 to being lifted or moved by the robotic arm 102. The rigidity of the item 204 may identify, for example, whether the item 204 is soft, pliable, or hard. The physical response of the item 204 may reveal certain characteristics of the item 204. For example, the item 204 may be soft or gelatinous and change shape when the robotic arm 102 grabs or lifts the item 204. As another example, the item 204 may be hinged and may open or close when the robotic arm 102 lifts or moves the item 204. The identification server 408 may compare the rigidity of the item 204 or the physical response of the item 204 to being lifted or moved to rigidity of items or to physical response of items identified in the manifest 412 to see which item in the manifest 412 has a rigidity or physical response that is most similar to the package 438 of the item 204.

The identification server 408 uses a machine learning model 440 to compare the sensor data 420 to characteristics of items identified in the manifest 412 to see which item in the manifest 412 is most similar to the item 204. The manifest 412 may identify the items in a container 202 identified by the container identifier 418. The manifest 412 may also include characteristics for each of these identified items. In the example of FIG. 4, the manifest 412 includes the characteristics for an Item 1 and an Item 2 in the container 202. The manifest 412 may identify additional items and include the characteristics of those additional items. In certain embodiments, the identification server 408 uses a combinatorial optimization algorithm instead of the machine learning model 440 to compare the sensor data 420 to the manifest 412. Generally, the algorithm uses the sensors data 42—finds an optimal item in the manifest 412. The optimal item may be the item in the manifest 412 whose characteristics most close approximate the characteristics in the sensor data 420.

The manifest 412 may include the characteristics of the items in the container 202. For example, the manifest 412 may include the image embeddings, weights, dimensions, code, text, shape, material, and package for the items identified in the manifest 412. The identification server 408 may compare the information in the sensor data 420 to the characteristics of the items identified in the manifest 412 to predict an identity of the item 204. For example, the identification server 408 may compare the image embedding 424 in the sensor data 420 with the image embedding 441 and the image embedding 456 for Items 1 and 2. As another example, the identification server 408 may compare the weight 426 in the sensor data 420 with the weights 442 and 458 for Items 1 and 2. The identification server 408 may compare the dimensions 428 in the sensor data 420 with the dimensions 444 and 460 for the Items 1 and 2. The identification server 408 may compare the text 432 with the text 448 and 464 of the Items 1 and 2. The identification server 408 may compare the shape 434 in the sensor data 420 to the shapes 450 and 466 for the Items 1 and 2. The identification server 408 may compare the material 436 in the sensor 420 with the materials 452 and 468 for the Items 1 and 2. The identification server 408 may compare the package 438 with the packages 454 and 470 for the Items 1 and 2. Additionally, if code 430 is available, the identification server 408 may compare the code 430 with the codes 446 and 462 for the Items 1 and 2. In some embodiments, if the rigidity or physical response of the item 204 is available, the identification server 408 may compare the rigidity or physical response with the rigidity or physical response for the Items 1 and 2.

If certain information is missing from the sensor data 420, then the identification server 408 may not compare that information with the corresponding characteristic in the manifest 412. For example, if text 432 is missing from the sensor data 420, then the identification server 408 may not compare the text 432 with text 448 and 464 for items one and two and the manifest 412.

Based on the comparison of the sensor data 420 with the information in the manifest 412, the identification server 408 uses the machine learning model 440 to predict an identity of the item 204 that generated the sensor data 420. The identification server 408 may identify the predicted item 472. The predicted item 472 may have a corresponding confidence level 474. The confidence level 474 may reflect a level of confidence that the identification server 408 has in the accuracy of the prediction. For example, the identification server 408 may compare the sensor data 420 to the information in the manifest 412 to determine a confidence level 474 for each in the manifest 412 (e.g., Item 1, Item 2, and other items identified in the manifest 412). The confidence level 474 for an item corresponds to the level of similarity between the characteristics in the sensor data 420 and the corresponding characteristics for the item in the manifest 412. The more similar the characteristics in the sensor data 420 are to the characteristics for the item in the manifest 412, the higher the confidence level 474. For example, an item in the manifest 412 with a high confidence level 474 may be an item whose image embedding, weight, dimensions, code, text, shape, material, or package match or are very similar to the information in the sensor data 420. An item in the manifest 412 that has characteristics that are not as similar to the information in the sensor data 420 may have a lower confidence level 474. The identification server 408 may predict that the item 204 that generated the sensor data 420 is the item in the manifest 412 that has the highest confidence level 474. In certain embodiments, by considering multiple characteristics of an item to identify the item, the identification server 408 has improved tolerance to noise in the data in the manifest 412 or the sensor data 420. For example, the sensor data 420 and the information for an item in the manifest 412 need not be perfectly accurate for the identification server 408 to make an accurate prediction. In some embodiments, the identification server 408 uses the combinatorial optimization algorithm instead of the machine learning model 440 to predict the identity of the item 204 that generated the sensor data 420.

In particular embodiments, the identification server 408 applies weights to the characteristics used to identify an item 204. In this manner, the identification server 408 can place greater emphasis on the characteristics that are more indicative of the identity of the item 204. For example, the identification server 408 may apply a greater weight to the comparison of the image embedding 424 than to the comparison of the material 436. As a result, the identification of the item 204 is affected more by the image embedding 424 comparison than by the material 436 comparison. The machine learning model 440 may be trained to determine or learn the weights to apply to the different characteristics. The machine learning model 440 may apply the weights in any manner. For example, the machine learning model 440 may generate a feature vector for each characteristic in the sensor data 420. The machine learning model 440 then applies the weights for each characteristic to the corresponding feature vector. The machine learning model 440 then fuses the weighted feature vectors and identifies the item 204 using the fused, weighted feature vector. As another example, the machine learning model 440 may generate a feature vector for each characteristic in the sensor data 420. Then, for each feature vector, the machine learning model 440 predicts an identity of an item 204. The machine learning model then applies weights for the characteristics to the respective predicted identity. The machine learning model 440 then analyzes the weighted predictions to determine an identity of the item 204.

The identification server 408 may generate an instruction 476 based on the identification of the item 204. For example, the identification server 408 may generate an instruction 476 that organizes or sorts the item 204 in the container 202. As another example, the instruction 476 may indicate a location where the item 204 should be moved. As yet another example, the instruction 476 may indicate that the item 204 should be discarded. The identification server 408 may communicate the instruction 476 to the robotic arm 102, and the robotic arm 102 may follow the instruction 476 to handle the identified item 204.

As discussed previously, the identification server 408 may communicate the predicted item 472 to the device 406 or the administrator 407 for validation. For example, if none of the confidence levels 474 for the items identified in the manifest 412 exceed a threshold, the identification server 408 may communicate the predicted item 472 to the device 406 for validation. The identification server 408 may also communicate some of the sensor data 420 to the device 406 or the administrator 407. The administrator 407 may review the sensor data 420 and the predicated item 472 to determine whether the identification server 408 was correct in its prediction. If the prediction was incorrect, the administrator 407 may fix or change the predicted item 472. If the prediction was correct, the administrator 407 may indicate to the identification server 408 that the prediction was correct and the identification server 408 may adjust the confidence level 474 accordingly. In some embodiments, the administrator 407 provides a label that identifies the item 204. The identification server 408 uses the label provided by the administrator 407 to train or update the machine learning model 440. In this manner, the machine learning model 440 is told the identity of the item 204 so that the machine learning model 440 improves at correctly predicting the identity of the item 204 (and similar items 204) in the future. Having the machine learning model 440 produce the confidence levels 474 from the input data provides a direct way to identify both low-confidence data that needs to be supplemented by human associates (e.g., the administrator 407), as well as examples around which the machine learning model 440 performs poorly. Labels can then be fed directly into training new models for any machine-learned functionality, including visual appearance models and identification confidence models.

In particular embodiments, one or more of the sensors 410 may be used to generate sensor data 420 before the robotic arm 102 has lifted an item 204 from the container 202. The identification server 408 may then use that limited sensor data 420 to predict an identity of items 204 in the container 202. The identification server 408 may then communicate an instruction 476 indicating a location of a particular item 204 in the container 202, so that the robotic arm 102 may move to lift that item 204 from the container 202. After the item 204 is lifted from the container 202, the sensors 410 may sense the characteristics of the item 204, and the identification server 408 may use the additional sensor data 420 to identify the lifted item 204. For example, the sensors 410 may sense characteristics of an assortment of items 204 in the container 202. The identification server 408 may receive the sensor data 420 and predict the identity of the items 204 in the container 202 based on the sensor data 420. The sensor data 420 may be limited to the sensors that can view into the container 202 (e.g., the 3D sensors 104, the color sensor 106, or the RGBD sensors 108). Based on the information from these sensors, the identification server 408 may distinguish and identify the assortment of items 204 in the container 202. The identification server 408 may then communicate to the robotic arm 102 an instruction 476 based on the identities and locations of the items 204 in the container 202. The instruction 476 may instruct the robotic arm 102 to lift an item 204 at a particular location from the container 202. In this manner, the system 400 already has a preliminary identification and confidence when the items 204 are still in the container 202. As an item 204 is lifted and manipulated, more observations (visual, 3d, weight etc.) are gathered and the identification may be updated. At any point, based on the confidence of identification, the system 400 can decide to act according to the identification result. The choice of decision point and confidence threshold may depend on the efficiency and error tolerance requirements of the application. The spectrum of this process may vary from in-container identification to joint identification, as discussed below.

In particular embodiments, the identification server 408 may identify the items 204 in the container 202 after the information for all the items 204 in the container 202 have been detected by the sensors 410. For example, the robotic arm 102 may lift an item 204 from the container 202, and the sensors 410 may detect characteristics of the lifted item 204. The robotic arm 102 may then put the item 204 aside and lift another item 204 from the container 202. The sensors 410 may then detect the characteristics of that item 204. This process may repeat until the robotic arm 102 has lifted all the items 204 from the container 202. The identification server 408 may receive the sensor data 420 for each of the items 204 in the container 202. The identification server 408 may then compare the sensor data 420 with the information in the manifest 412 to determine confidence levels 474 for each of the items identified in the manifest 412. The identification server may then predict the identity of an item 204 in the container 202 based on an item in the manifest 412 with the highest confidence level 474. After the identification server has identified the item 204, the identification server 408 may move onto another sensor data 420 to identify another item 204 in the container 202, but with the already identified item in the manifest 412 as an excluded option. In this manner, the identification server 408 may implement deductive logic to improve the accuracy of the predictions in the container 202.

Figure 5:
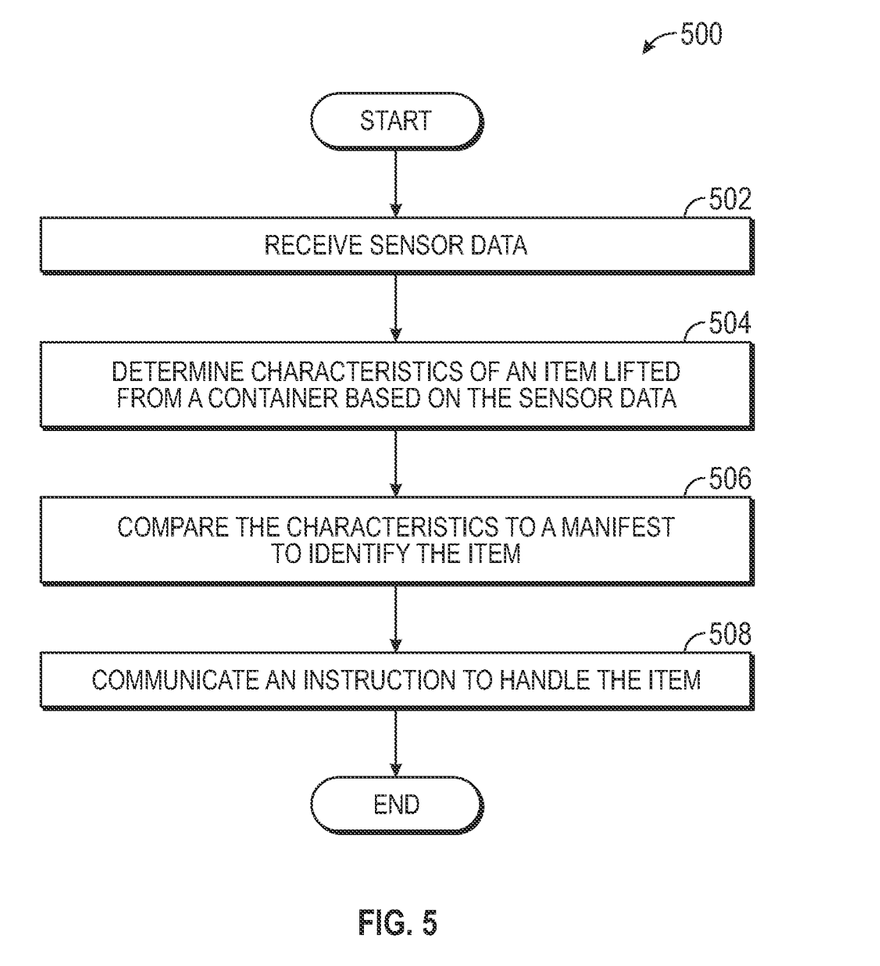
FIG. 5 is a flowchart of an example method in the system of FIG. 4.

FIG. 5 is a flowchart of an example method 500 in the system 400 of FIG. 4. The identification server 408 may perform the method 500. In particular embodiments, by performing the method 500, the identification server 408 may identify an item 204 lifted out of a container 202, even though a bar code on the item 204 was not scanned. The identification server 408 receives sensor data 420 in block 502. The sensor data 420 may include characteristics of the item 204 that was lifted out of the container 202. The sensor data 420 may indicate characteristics of the item 204 detected by one or more sensors 410. The characteristics may include an image embedding 424 of the item 204 a weight 426 of the item 204, a dimension 428 of the item 204, text 432 printed on the item 204, a shape 434 of the item 204, a material 436 used to form the item 204, or a package 438 used to hold the item 204. In some embodiments, the sensor data 420 includes a rigidity of the item 204 or a physical response of the item 204 to being lifted or moved. The identification server 408 may use this information to identify the item 204.

In block 506, the identification server 408 compares the characteristics in the sensor data 420 to a manifest 412 to identify the item 204. The manifest 412 may have been retrieved from a database 404 based on a received container identifier 418. The manifest 412 may identify the items 204 being held by the container 202. The manifest 412 may also include characteristics of the items 204 in the container 202. The identification server 408 compares the characteristics in the sensor data 420 with the characteristics of the items in the manifest 412 to determine which item in the manifest 412 is the item 204 lifted out of the container 202. The identification server 408 uses a machine learning model 440 to compare the characteristics in the sensor data 420 to the manifest 412. The machine learning model 440 identifies, based on the characteristics in the sensor data 420, the item in the manifest 412 that is most similar to the item 204.

In block 508, the identification server 408 communicates an instruction 476 to handle the identified item 204. The instruction 476 may instruct the robotic arm 102 how to handle the item 204 based on its identification. For example, the instruction 476 may instruct the robotic arm to sort or organize the item 204 in the container 202. As another example, the instruction 476 may instruct the robotic arm to place the item 204 at a particular location. As yet another example, the instruction 476 may instruct the robotic arm 102 to discard the item 204.

The identification server 408 may determine a confidence level 474 for each item identified in the manifest 412. The confidence level 474 for an item in the manifest 412 represents a similarity between the characteristics in the sensor data 420 and the characteristics for that item in the manifest 412. The more similar the sensor data 420 is to the characteristics for that item in the manifest 412, the higher the confidence level 474 for that item. The identification server 408 may predict or determine the identity of the item 204 based on the item in the manifest 412 with the highest confidence level 474.

Figure 6:
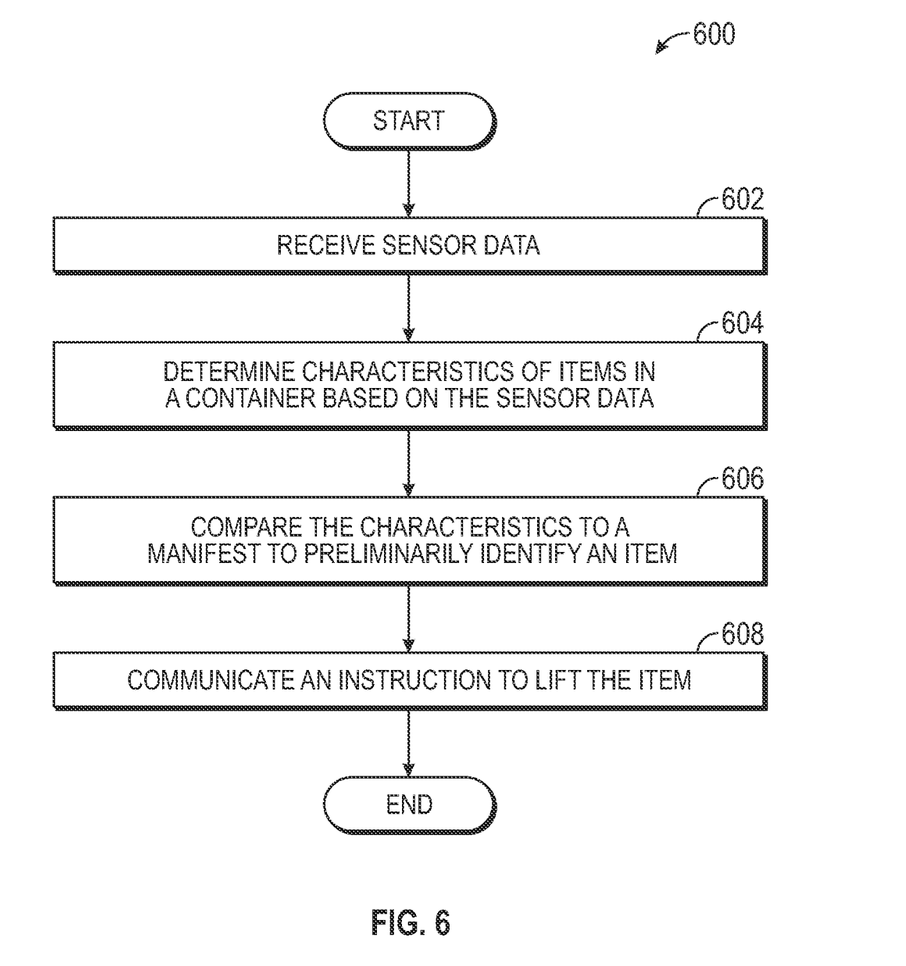
FIG. 6 is a flowchart of an example method in the system of FIG. 4.

FIG. 6 is a flowchart of an example method 600 in the system 400 of FIG. 4. The identification server 408 may perform the method 600. In particular embodiments, by performing the method 600 the identification sever 408 may preliminarily identify items in the container 202 using limited sensor data 420.

In block 602, the identification server 408 receives sensor data 420. The sensor data 420 may include detected characteristics of items 204 in the container 202. For example, the sensor data 420 may include dimensions 428 and shapes 434 of items 204 in the container 202. The identification server 408 may use this limited sensor data 420 to identify the items 204 in the container 202 and their locations. In block 604, the identification server 408 determines characteristics of items 204 in the container 202 based on the sensor data 420.

In block 606, the identification server 408 compares the characteristics to a manifest 412 to preliminarily identify items 204 in the container 202. For example, the identification server 408 may compare the characteristics in the sensor data 420 to characteristics of items identified in the manifest 412. The identification server 408 may determine a confidence level 474 for each item identified in the manifest 412. The identification server 408 may then determine the identity of the items 204 in the container 202 based on these confidence levels 474.

In block 608, the identification server 408 communicates an instruction 476 to lift an item 204 from the container 202 based on the identification. For example, the instruction 476 may indicate a location of a particular item 204 in the container 202. The robotic arm 102 may respond to the instruction 476 by lifting the item 204 from the container 202.

Figure 7:
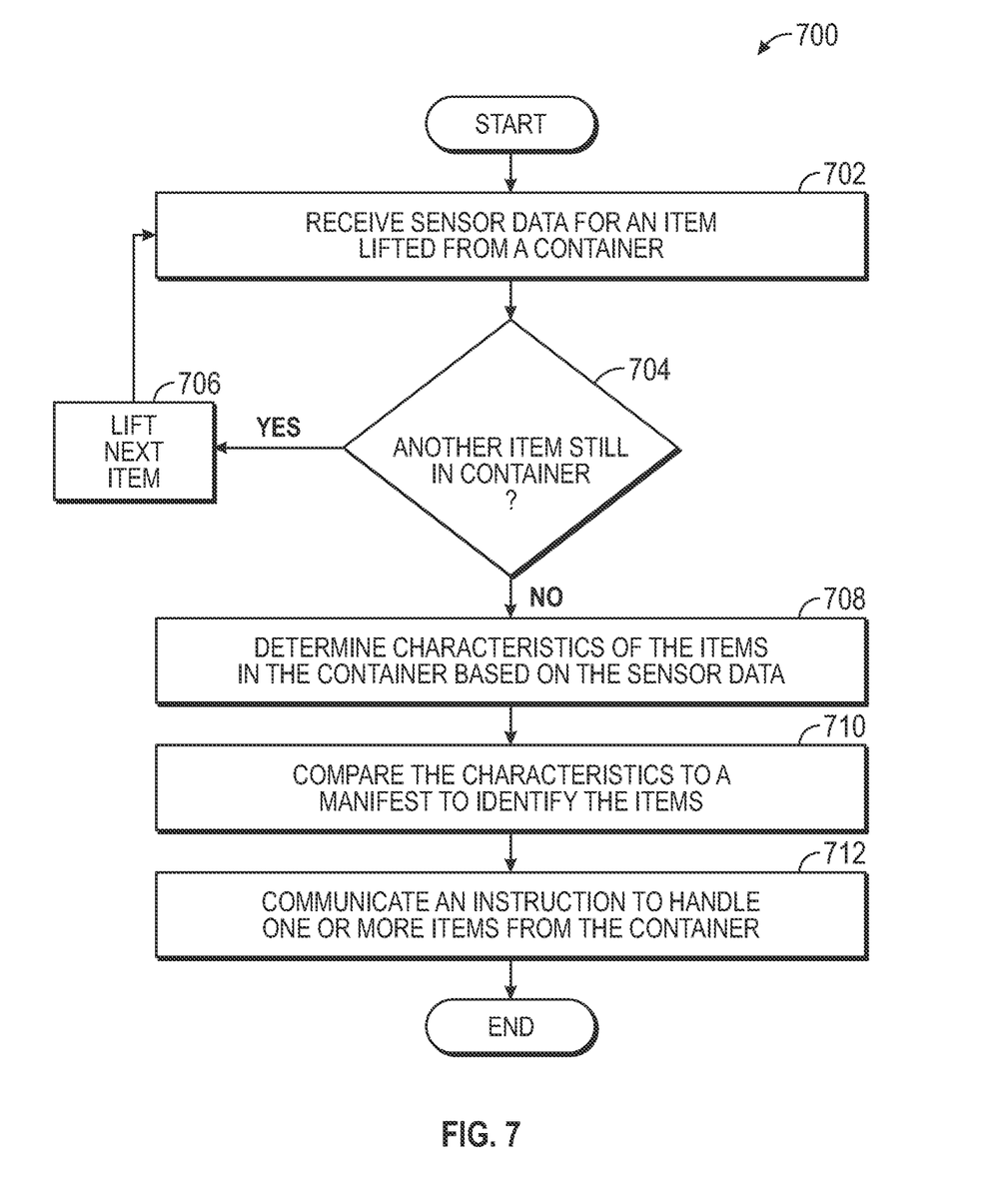
FIG. 7 is a flowchart of an example method in the system of FIG. 4.

FIG. 7 is a flowchart of example method 700 in the system 400 of FIG. 4. The identification server 408 may perform the method 700. In particular embodiments, by performing the method 700, the identification server 408 may apply deductive logic to identify items 204 in the container 202.

In block 702, the identification server 408 receives sensor data 420 for an item 204 lifted from a container 202. The sensor data 420 may include characteristics of that item detected by the sensors 410. For example, the sensor data 420 may include an image embedding 424 for the item 204, a weight 426 and a dimension 428 of the item 204, text 432 printed on the item 204, a shape 434 of the item 204, a material 436 of the item 204, and a package 438 holding the item 204.

In block 704, the identification server 408 may determine whether another item is still in the container 202. For example, the identification server 408 may use a sensor 112 to determine a weight of the container 202 and the items 204 remaining in the container 202. If the determined weight is greater than the weight of the container 202, then the identification server 408 may determine that the container 202 still contains another item 204. If the determined weight is close to or equals the weight of the container 202, then the identification server 408 may determine that no item 204 remains in the container 202.

If the identification server 408 determines that an item 204 remains in the container 202, the identification server 408 may lift another item 204 from the container 202 in block 706. The identification server 408 may then return to block 702 to detect or receive sensor data 420 of the item 204 that was lifted from the container 202.

If no item 204 remains in the container 202, the identification server 408 may proceed to block 708 to determine characteristics of the items 204 in the container 202 based on the sensor data 420. As a result, the identification server 408 may have a collection of sensor data 420 for the various items 204 in the container 202. This collection of sensor data 420 may identify characteristics of each of the items 204 in the container 202.

In block 710, the identification server 408 compares the characteristics to a manifest 412 to identify the items 204 in the container 202. For example, the identification server 408 may compare the characteristics in the collection of sensor data 420 to the characteristics for the items identified in the manifest 412. The identification server 408 may determine confidence levels 474 for each of the items identified in the manifest 412. The identification server 408 may implement deductive logic to eliminate particular items in the manifest 412 from being options on a subsequent identification, if the item had already been predicted as the identity of an item 204 in the container 202. For example, after the identification server 408 identifies a first item based on the confidence levels 474, the identification server 408 may identify a second item but with the first item removed as a possible option for the identification. In this manner, the identification server 408 takes into account information about all the items in the container 202 when making predictions (as opposed to identifying items in the container 202 one by one as sensor data is generated for those items).

In block 712, the identification server 408 communicates an instruction 476 to handle one or more items 204 from the container 202. For example, the instruction may instruct the robotic arm 102 to move one or more of the items 204 according to their identifications. As another example, the instruction 476 may instruct the robotic arm 102 to discard one or more of the items 204 based on their identification.

Figure 8:
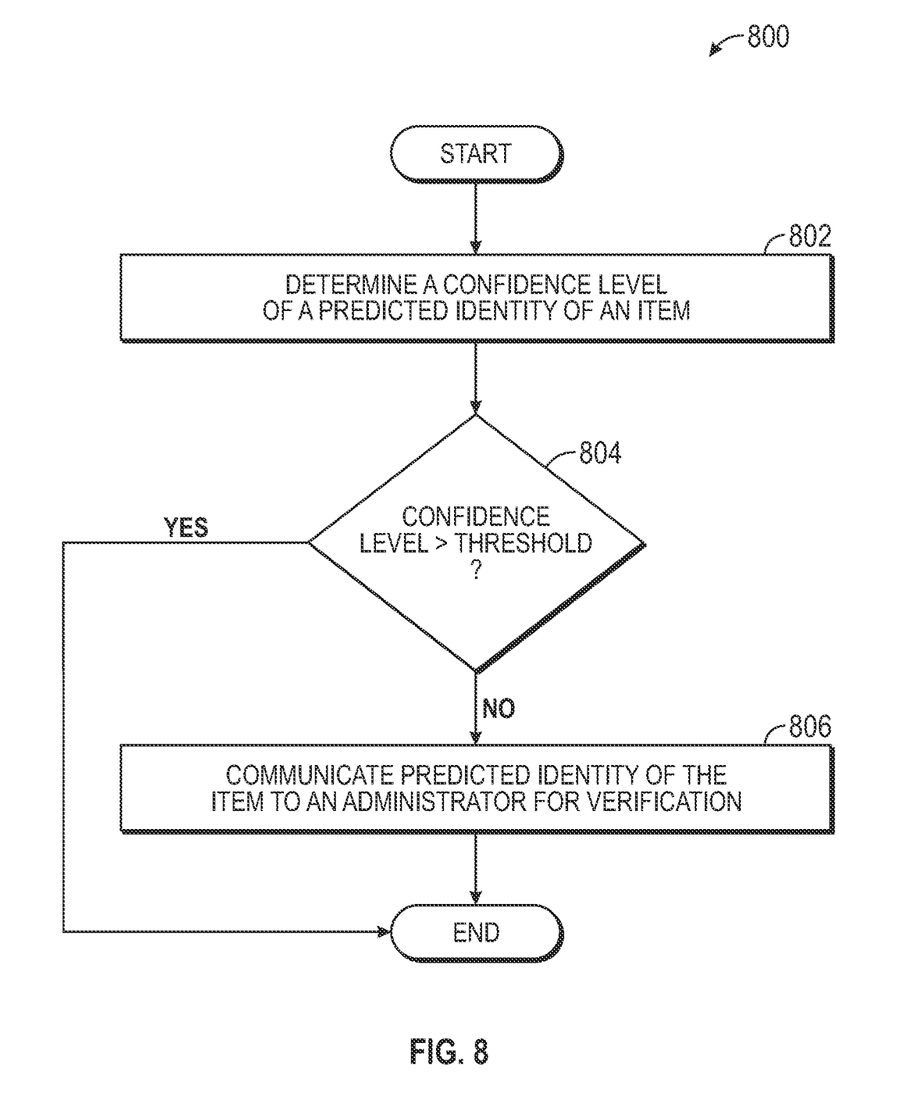
FIG. 8 is a flowchart of an example method in the system of FIG. 4.

FIG. 8 is a flowchart of an example method 800 in the system 400 of FIG. 4. The identification server 408 may perform the method 800. In particular embodiments, by performing the method 800, the identification server 408 may use an administrator 407 to validate the predicted identities of items 204.

In block 802, the identification server 408 determines a confidence level 474 of a predicted identity 472 of an item 204. The confidence level 474 may reflect a level of confidence that the identification server 408 has in the correctness or accuracy of the prediction. In block 804, the identification server 408 determines whether the confidence level 474 is greater than a threshold. If the confidence level 474 exceeds the threshold, then the identification server 408 may conclude the method 800.

If the confidence level 474 does not exceed the threshold, then the identification server 408 may proceed to communicate the predicted identity 472 of the item 204 to administrator 407 for verification in block 806. The administrator 407 may review the predicted identity 472 along with any received sensor data 420 about the item 204 to determine whether the prediction was correct or not. If the prediction was correct, the administrator 407 may validate the prediction and the identification server 408 may update the confidence level 474 accordingly. If the prediction was incorrect, the administrator 407 may correct or change the prediction and inform the identification server 408 of the correct prediction. In this manner, the identification server 408 may have its predictions validated when the identification server 408 has low confidence in the accuracy of its prediction.

In some embodiments, the administrator 407 provides a label that indicates the correct identification of the item 204. The identification server 408 uses this label to train or update a machine learning model 440 that the identification server 408 uses to predict the identity of items 204. By instructing the machine learning model 440 as to the correct identification of the item 204, the machine learning model 440 produces more accurate and more confident predictions in the future for the item 204 (and similar items 204), in certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the database 404 or the identification server 408) or related data available in the cloud. For example, the database 404 or the identification server 408 could execute on a computing system in the cloud and operate to identify items in a container 202. In such a case, the database 404 could store manifests 412 at a storage location in the cloud, and the identification server 408 could retrieve the manifests 412 from the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system comprising:
a plurality of sensors;
a container positioned on at least one of the plurality of sensors, the container holding a plurality of items, wherein the at least one of the plurality of sensors is configured to determine a first weight of the container;
a robotic arm configured to lift an item out of the container, wherein the at least one of the plurality of sensors is configured to determine a second weight of the container after the robotic arm has lifted the item out of the container; and
an identification server comprising a hardware processor configured to receive output from the plurality of sensors and further configured to:
determine a weight of the item;
determine a visual appearance of the item;
determine, using the visual appearance, a preliminary identity of the item before the robotic arm has lifted the item out of the container, wherein the robotic arm is configured to use the preliminary identity to determine which item of the plurality of items to lift out of the container;
determine a dimension of the item;
determine a barcode of the item;
compare the weight, visual appearance, dimension, and barcode of the item to a manifest for the container, wherein the manifest identifies the plurality of items;
determine, based on comparing the weight, visual appearance, dimension and barcode of the item to the manifest, an identity of the item; and
communicate an instruction to the robotic arm to sort the item based on the determined identity, wherein the determined identity is different than the preliminary identity.

2. The system of claim 1, wherein the hardware processor is further configured to determine a weight, visual appearance, dimension, and barcode of every item in the plurality of items before determining the identity of the item.

3. The system of claim 1, wherein the hardware processor is further configured to:
determine a confidence level for the determined identity; and
communicate the determined identity to an administrator if the confidence level is below a threshold.

4. An apparatus comprising:
a memory; and
a hardware processor communicatively coupled to the memory, the hardware processor configured to:
determine one or more of a weight of an item, a packaging type of the item, a packaging material of the item, a barcode of the item, a rigidity of the item, or a physical response of the item to being lifted;
determine a visual appearance of the item;
determine, using the visual appearance and the shape or size, a preliminary identity of the item before the item is lifted out of a container, wherein the preliminary identity is used to determine which item to lift out of the container;
determine a shape or a size of the item;
compare, using a machine learning model, the visual appearance, the shape or size, and one or more of the weight, packaging type, packaging material, barcode, rigidity, or the physical response of the item to a manifest for the container, wherein the manifest identifies a plurality of items in the container; and determine, using the machine learning model, an identity of the item based on comparing the visual appearance, the shape or size, and one or more of the weight, packaging type, packaging material, barcode, rigidity, or the physical response of the item to the manifest, wherein the identity is different than the preliminary identity.

5. The apparatus of claim 4, wherein the hardware processor is further configured to determine a shape of the item and wherein determining the identity of the item is further based on comparing the shape of the item to the manifest.

6. The apparatus of claim 4, wherein the hardware processor is further configured to determine text on the item and wherein determining the identity of the item is further based on comparing the text to the manifest.

7. The apparatus of claim 4, wherein the hardware processor is further configured to determine a visual appearance of a bottom of the item and a visual appearance of a side of the item.

8. The apparatus of claim 4, wherein the hardware processor is further configured to communicate, to a robotic arm that lifted the item out of the container, an instruction to sort the item based on the determined identity.

9. The apparatus of claim 4, wherein the hardware processor is further configured to determine a vector comprising a numerical representation of the visual appearance of the item and wherein determining the identity of the item is further based on comparing the vector to the manifest.

10. The apparatus of claim 4, wherein the hardware processor is further configured to determine visual appearances and shapes or sizes of a plurality of items in the container before determining the identity of the item.

11. The apparatus of claim 4, wherein the hardware processor is further configured to:
determine a confidence level for the determined identity; and
communicate the determined identity for the item to an administrator if the confidence level is below a threshold.

12. The apparatus of claim 11, wherein the hardware processor is further configured to:
receive a label for the item from the administrator; and
update the machine learning model using the label.

13. The apparatus of claim 4, wherein the hardware processor is further configured to apply weights to the visual appearance, the shape or size, and one or more of the weight, packaging type, packaging material, barcode, rigidity, or the physical response of the item before comparing the visual appearance, the shape or size, and one or more of the weight, packaging type, packaging material, barcode, rigidity, or the physical response of the item to a manifest for a container.

14. A method comprising:
determining one or more of a weight of an item, a packaging type of the item, a packaging material of the item, a barcode of the item, a rigidity of the item, or a physical response of the item to being lifted;
determining a visual appearance of the item;
determining, using the visual appearance and the shape or size, a preliminary identity of the item before the item is lifted out of a container, wherein the preliminary identity is used to determine which item to lift out of the container;
determining a shape or size of the item;
comparing, using a machine learning model or a combinatorial optimization algorithm, the visual appearance, the shape or size, and one or more of the weight, packaging type, packaging material, barcode, rigidity, or the physical response of the item to a manifest for the container, wherein the manifest identifies a plurality of items in the container;
determining, using the machine learning model or the combinatorial optimization algorithm, an identity of the item based on comparing the visual appearance, the shape or size, and one or more of the weight, packaging type, packaging material, barcode, rigidity, or the physical response of the item to the manifest; and
communicating an instruction to a robotic arm to sort the item based on the determined identity.

15. The method of claim 14, further comprising determining, using the machine learning model or the combinatorial optimization algorithm, visual appearances and shapes or sizes of a plurality of items that are in the container prior to determining the identity of the item.

16. The method of claim 14, further comprising:
determining a confidence level for the determined identity; and
communicating the determined identity to an administrator if the confidence level is below a threshold.

17. The method of claim 16, further comprising:
receiving a label for the item from the administrator; and
updating the machine learning model using the label.

* * * * *